United States Patent [19]

Nessett et al.

[11] Patent Number: 5,742,759
[45] Date of Patent: Apr. 21, 1998

[54] METHOD AND SYSTEM FOR FACILITATING ACCESS CONTROL TO SYSTEM RESOURCES IN A DISTRIBUTED COMPUTER SYSTEM

[75] Inventors: Danny M. Nessett, Fremont; Theron D. Tock, Sunnyvale, both of Calif.

[73] Assignee: Sun Microsystems, Inc., Palo Alto, Calif.

[21] Appl. No.: 516,671

[22] Filed: Aug. 18, 1995

[51] Int. Cl.$^6$ .................................................. G06F 15/00
[52] U.S. Cl. .................. 395/187.01; 395/800.28; 395/800.3; 395/200.33; 395/200.49; 395/200.55; 395/200.59; 711/163
[58] Field of Search ........................ 395/800, 133, 395/186, 187.01, 188.01, 200.11, 200.06, 200.03, 200.02, 683, 490, 491, 800.28, 800.3, 200, 31, 33, 47, 48, 49, 55, 59; 380/4, 30

[56] References Cited

U.S. PATENT DOCUMENTS

| | | | |
|---|---|---|---|
| 4,919,545 | 4/1990 | Yu | 380/25 |
| 5,138,712 | 8/1992 | Corbin | 395/186 |
| 5,204,897 | 4/1993 | Wyman | 380/4 |
| 5,261,102 | 11/1993 | Hoffman | 395/186 |
| 5,263,165 | 11/1993 | Janis | 395/490 |
| 5,412,717 | 5/1995 | Fischer | 380/4 |
| 5,421,011 | 5/1995 | Camillone et al. | 395/654 |
| 5,455,953 | 10/1995 | Russell | 395/739 |
| 5,475,753 | 12/1995 | Barbara et al. | 380/4 |
| 5,481,715 | 1/1996 | Hamilton et al. | 395/684 |
| 5,491,752 | 2/1996 | Kaufman et al. | 380/30 |

(List continued on next page.)

OTHER PUBLICATIONS

"Object–Oriented Software Construction", by Bertrand Meyer, Prentice Hall 1988.

"Authentication in Distributed systems: Theory and Practice", by Butler Lampson et al., Digital Equipment Corporation, ACM Transactions on Computer Systems, vol. 10, No. 4, Nov. 1992, pp. 265–310.

(List continued on next page.)

Primary Examiner—Meng-Ai T. An
Attorney, Agent, or Firm—Timothy J. Crean; Patrick J. S. Inouye

[57] ABSTRACT

Embodiments of the present invention provide an improved method and system for securely controlling access to resources in a distributed computer system. One embodiment of the present invention stores and binds a group identification to a target object and then uses membership checking to determine whether a client object which requests access to the target object is a member of a group with access rights to the target object. In this way, the present invention avoids performing costly cryptographic operations in order to verify access rights of requesting objects, as was common in some prior art systems.

A second embodiment of the present invention stores and binds a group identification to a target object reference and then passes the target object reference to client objects in the system. Since the target object reference includes a group identification entry, a first client object is able to determine which other clients in the system are members of the identified group. This determination allows the first client object to pass the target object reference to the other members of the group without first communicating with the server for the target object. In this way, the present invention avoids the costly transaction costs of communicating with the server for the target object.

18 Claims, 5 Drawing Sheets

U.S. PATENT DOCUMENTS

| | | | |
|---|---|---|---|
| 5,539,906 | 7/1996 | Abraham et al. | 395/609 |
| 5,572,673 | 11/1996 | Shurts | 395/186 |
| 5,577,252 | 11/1996 | Nelson et al. | 395/670 |

OTHER PUBLICATIONS

"Remote: a System Supporting Practical Authorization in Large Heterogeneous Distributed Systems", by J. G. Fletcher and D.M. Nessett, Internetworking: Research and Experience, vol. 4, pp. 159–172, 1993.

"Resource Access Control In a Network Operating System", by J.E. Donnelley and J.G. Fletcher, Lawerence Livermore Laboratory, UCRL–84319, Rev. 1, 1980, pp. 1–11.

"Identifier Protection in a Distributed Operating System", by D.M. Nessett, Lawerence Livermore Laboratory, UCRL–86143, 1981, pp. 1–6.

"A Secure Identity–Based Capability System", by Li Gong, University of Cambridge Computer Laboratory, 1989, pp. 56–63.

METHOD AND SYSTEM FOR FACILITATING ACCESS CONTROL TO SYSTEM RESOURCES IN A DISTRIBUTED COMPUTER SYSTEM

FIELD OF THE INVENTION

The method and system of the present invention relates generally to providing security in computer systems and, more particularly, to controlling access to system resources by utilizing a group identity bound to an object reference or capability.

BACKGROUND OF THE INVENTION

In an object oriented system, an object is a component comprising data and operations which can be invoked to manipulate the data. The operations (also called "methods") are invoked on the object by sending calls to the object. Each object has an object type that defines the operations that can be performed on objects of that type. One object type may inherit the object operations defined and implemented for other object types. For further description of object oriented design and programming techniques see "Object-Oriented Software Construction" by Bertrand Meyer, Prentice-Hall 1988, which is incorporated herein by reference.

In client-server computing, typically there is a set of computers that can communicate with one another through a network connecting the computers. Some of these computers act as providers of services or functionality to other computers. The provider of a service or functionality is known as a "server", and the consumer of the service or functionality is called a "client". The client-server model also generalizes to the case where distinct programs or processes are running on the same computer and communicating with one another through some protected mechanism and are acting as providers and consumers of functionality.

In object oriented distributed systems based upon the client-server model, there exist servers that provide object oriented interfaces to their clients. These servers support objects consisting of data and the associated software for manipulating the data according to the operations permitted by this type of object. Clients may obtain access to these objects and may execute calls on them by transmitting the calls to the server. At the server these calls are executed via the software associated with the object. The results of these calls are then transmitted back to the client.

Currently, a number of companies have agreed to standardize certain object definitions and interfaces to permit the sharing of such objects with one another. One system, designed to enable participation in such inter-company sharing of objects, is called Distributed Objects Environment ("DOE"), created by Sun Microsystems, Inc.[1]

[1]. Sun, DOE, and Sun Microsystems. Inc. are trademarks or registered trademarks of Sun Microsystems, Inc., in the United States and other countries.

DOE is an object-oriented system, providing remote access from clients to DOE objects. Server applications implement DOE objects. For any given DOE object, a DOE server can create an object reference that acts as a pointer to the DOE object. A DOE object reference can be passed around between different processes on one machine or between different machines and it will still point to the original object.

When a client application at one location obtains a DOE object reference, it can send calls (method invocation requests) to the target DOE object. The target DOE object can then execute these calls, possibly updating its internal state (its data) and possibly returning some results to its caller. As part of processing a method invocation, a server can itself invoke other objects, creating a chain of object invocations.

The advent of such object sharing with entities which are outside of a user's direct control raises a number of security issues. For example, it is desired to allow DOE users to access objects that are scattered across large sets of machines. But it is essential to make sure that only authorized users are allowed to access objects, so the data the objects encapsulate is not available to or changeable by unauthorized users.

As a partial solution to such security concerns, some servers provide secure access to their objects, so that only appropriately designated users can access the objects. When a client application wants to access to a secure object, it must establish an authenticated connection to the server which contains the implementation of the secure object. While establishing this connection, the client application must prove to the server which user the client application is representing. Thus for example, the client application may be representing the human user Susan. (As part of the business of logging into the client computer the human user purporting to be Susan will probably have had to provide some kind of authenticating information, e.g., a password to the client computer.) After the authenticated connection has been established, the server will be convinced that the given connection is to an application which has been empowered to represent a given user. The server will record the name of this user and will associate this user's name with the given connection. The art of establishing authenticated connections is well understood. See for example "Authentication in Distributed Systems: Theory and Practice" by Butler Lampson, Martin Abadi, Michael Burrows and Edward Wobber, ACM Transactions on Computer Systems, 10(4), November 1992.

The normal DOE model is that clients invoke operations on remote objects. The server can require that the request be issued on an authenticated connection and can therefore validate that the client application is representing an authenticated user. The server can then perform a check to see that this authenticated user is really authorized to do the operation.

Complications arise as soon as the user wants a server to perform some action that requires the server to access some other secure server. For example, a user may request a client application to obtain a compound document (e.g., an annual sales report containing spreadsheet graphs and explanatory text), part of which is located on a first server (e.g., the text) and part on a second server (e.g., the graphs). The first server can authenticate the requesting user and verify that the user is authorized to make the request. However if the first server then must access the second server for some data to complete the users response, the second server must authenticate the first server and must ensure that the first server was granted access by the client or has adequate access permissions to perform its requested action on the object. This problem is referred to as the delegation problem. It occurs whenever it is necessary for a client to delegate part of its authority to a server in order to allow it to get its job done.

Delegation by the user to a given server to act in the user's name in accessing a second server requires that users trust many machines, which leaves them open to security attacks, or the users must trust only a small set of known machines, which severely limits the user's access to desirable objects. Similarly, accepting access requests from clients distributed throughout the network poses substantial security risks to the servers themselves. Thus, it would be desirable to develop an improved method and system for securely delegating access control rights in a distributed, networked environment.

The present invention is an elegant and simple way to solve the problem of securely dealing with access requests from various servers in a distributed computer system within a networked environment, and is more fully described below.

SUMMARY OF THE INVENTION

Embodiments of the present invention provide an improved method and system for securely controlling access to resources in a distributed computer system. One embodiment of the present invention stores and binds a group identification with a target object and then uses membership checking to determine whether a client object which requests access to the target object operates on behalf of a user who is a member of this group. In this way, the present invention avoids performing costly cryptographic operations in order to verify access rights of requesting objects, as was common in some prior art systems.

A second embodiment of the present invention stores and binds a group identification to a target object reference and then passes the target object reference to client objects in the system. Since the target object reference includes a group identification entry, a first client object is able to determine which other clients in the system are members of the identified group. This determination allows the first client object to pass the target object reference to the other members of the group without first communicating with the server for the target object. In this way, the present invention avoids the costly transaction costs of communicating with the server for the target object.

NOTATIONS AND NOMENCLATURE

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

DETAILED DESCRIPTION

Overview Of The Preferred Method

Embodiments of the present invention provide an improved method and system for securely controlling access to resources in a distributed computer system. One embodiment of the present invention stores and binds a group identification with a target object and then uses membership checking to determine whether a client object which requests access to the target object operates on behalf of a user who is a member of this group. In this way, the present invention avoids performing costly cryptographic operations in order to verify access rights of requesting objects, as was common in some prior art systems.

A second embodiment of the present invention stores and binds a group identification to a target object reference and then passes the target object reference to client objects in the system. Since the target object reference includes a group identification entry, a first client object is able to determine which other clients in the system are members of the identified group. This determination allows the first client object to pass the target object reference to the other members of the group without first communicating with the server for the target object. In this way, the present invention avoids the costly transaction costs of communicating with the server for the target object.

Overview Of The Preferred System

Figure 1:
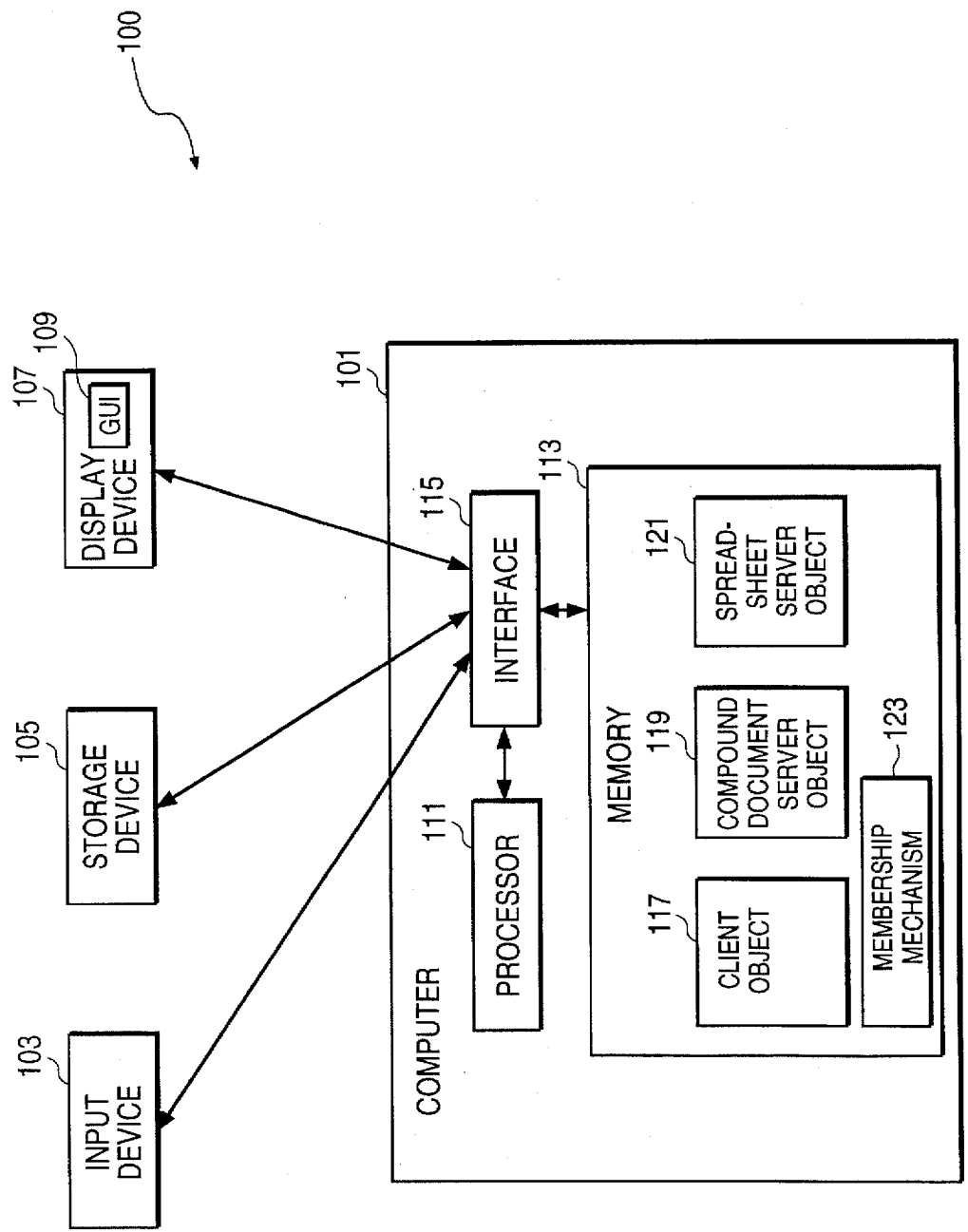
FIG. 1 is a block diagram of a computer system for practicing the preferred embodiment of the present invention.

FIG. 1 is a block diagram of a computer system 100 for practicing the preferred embodiment of the present invention. The computer system 100 includes a computer 101, an input device 103, a storage device 105, and a display device 107. The display device 107 displays a graphical user interface (GUI) 109. The GUI presents information through icons, and a user invokes commands by pointing to or manipulating the icons. The computer 101 includes a processor 111, a memory 113, and an interface 115 for enabling communication between the processor 111 and peripheral devices such as the input device 103 and the display device 107.

The computer memory contains a number of items including a client object 117, a compound document server object 119, and a spreadsheet server object 121. The contents of the memory 113 will be discussed in more detail below.

Embodiments Of The Invention

The various embodiments of the present invention are perhaps best described by way of example. Both embodiments described herein will be discussed in the context of creating and printing a compound document. A compound document typically includes both text and graphics. For example, an annual sales report which contains charts and graphs depicting yearly sales growth and explanatory text would be implemented as a compound document. Oftentimes, the charts and graphs are stored under control of a spreadsheet server while the text for the compound document is stored under control of a compound document server, along with a link to the charm and graphs.

While the present examples take place between different processes residing on one computer, those of ordinary skill in the art will understand that the teachings herein are equally applicable to objects and processes distributed throughout a networked environment.

Before processing begins in either embodiment, however, certain preconditions should exist within the computer system 100. It is assumed that a user (or "principal") has successfully logged on to and has acquired credentials for the system 100 and has invoked the client object 117. In the present example, the client object 117 typically corresponds to a process containing a wordprocessing application. Principal credentials are then stored with the client object 117 in order to indicate that the object 117 is acting on behalf of the principal. Furthermore, the principal is associated with a group of other principals having access privileges on the computer system 100. For example, a salesperson may be associated with a group for the Sales Department. Each group defined in the system 100 has a unique group identifier associated with it. In addition, a mechanism (e.g., mechanism 123) for checking membership credentials should be present to determine whether an object acting on behalf of a principal is or is not a member of a specified group. Any well known method or system for implementing a membership mechanism may be used to implement this aspect of the system 100.

First Embodiment

Figure 2B:
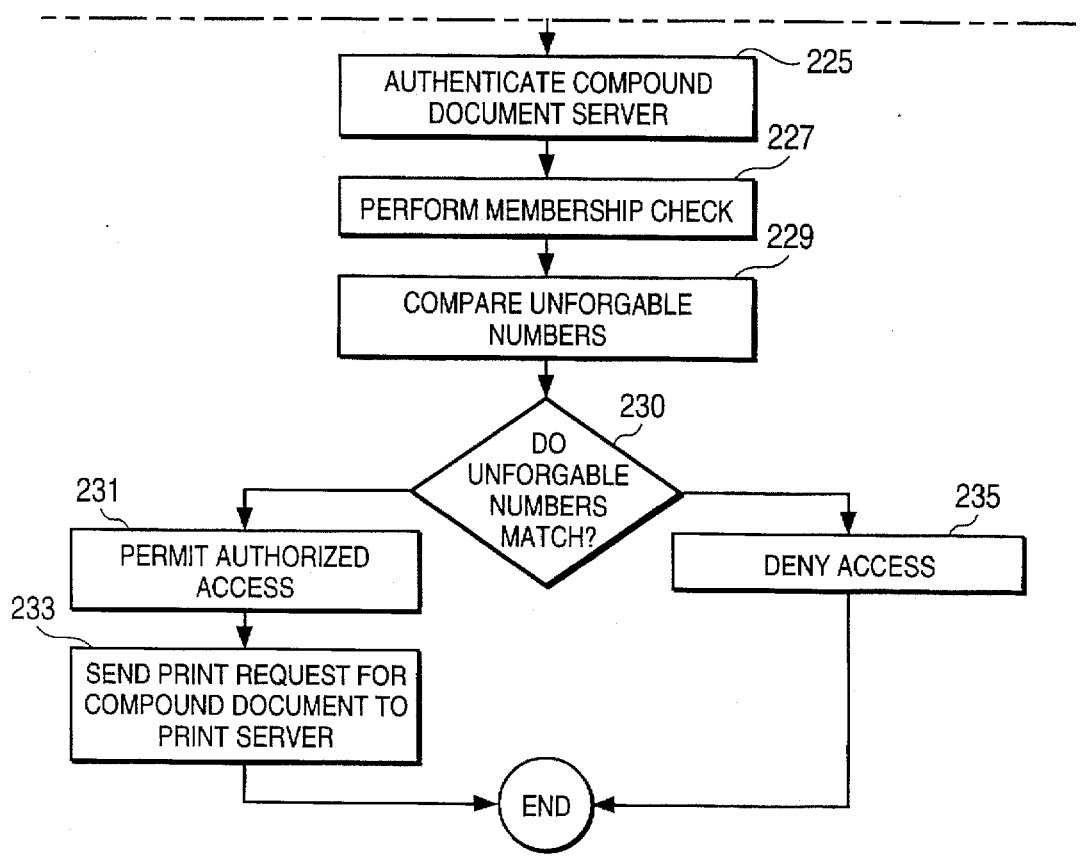
FIG. 2 is a flow diagram illustrating the preferred steps of the first embodiment for securely controlling access to system resources.
Figure 2:
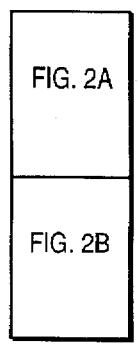
Figure 2A:
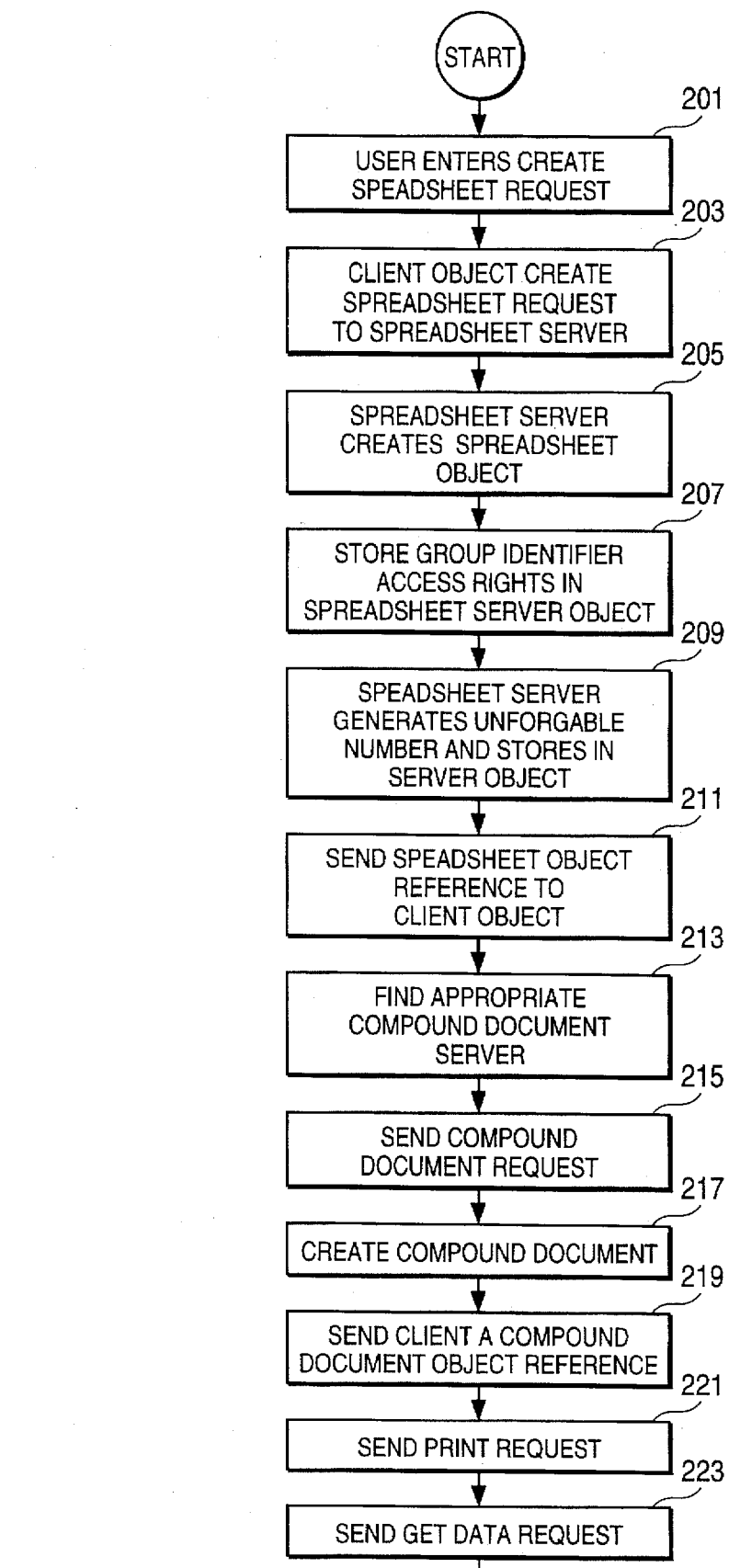

FIG. 2 is a flow diagram illustrating the preferred steps of the first embodiment for securely controlling access to system resources. The steps of FIG. 2 are typically initiated in response to user input. Suppose that the principal initiates a request on the client 117 to create a spreadsheet (Step 201). In response to the input, the client object 117 sends a Create request to the spreadsheet server object (Step 203). The request indicates that a spreadsheet object should be instantiated. The request also includes the group identifier associated with the user on whose behalf the compound document server operates.

The spreadsheet server object receives the request and creates the spreadsheet object (Step 205). The spreadsheet server object then stores with the spreadsheet object the group identifier, along with an indication of the access rights the group members have with respect to the spreadsheet object (Step 207). Finally, the spreadsheet server object generates an unforgeable number and stores the unforgeable number with the spreadsheet object (Step 209). In this way, the spreadsheet server object, when presented with the unforgeable number by a client object requesting access to the server object, can have some assurance, that the requesting client has the authority to access the spreadsheet object. The unforgeable number is often called a "capability." An unforgeable number is one that is computationally difficult to determine.

The spreadsheet server object then sends to the client object 117, a spreadsheet object reference (Step 211). In the preferred embodiment, the spreadsheet object reference comprises the previously generated unforgeable number.

Once the spreadsheet server object returns processing control to the client object, the client object finds a compound document server that operates on behalf of a principal in the group (Step 213). Next, the client object sends a request to create a compound document to the compound document server 119 (Step 215). The Create request includes an indication that a compound document should be created. The Cream request also includes the spreadsheet object reference so that the compound document server knows which spreadsheet object to incorporate into its compound document. Finally, the Create request includes a selected group identifier so that the compound document server can later determine whether a principal requesting access to the compound document is authorized to access the compound document.

The compound document server creates the compound document and stores the spreadsheet object reference and the group identifier in the compound document (Step 217). Next, the compound document server generates an unforgeable number and stores the unforgeable number with the compound document object. In this way, the compound document server object, when presented with the unforgeable number by a client object requesting access to the compound document object, can have some assurance that the requesting client has the authority to access the compound document object.

The compound document server object 119 then sends to the client object 117, a compound document object reference (Step 219). In the preferred embodiment, the compound document object reference comprises the unforgeable number generated by the compound document server object.

At some later point in time the client object sends a print request to the compound document server (Step 221). The Print request passes the compound document reference and the identity of the client's principal to the compound document server. The client uses any well known authentication mechanism to prove to the compound document server that it has the right to operate on behalf of the client's principal. By passing the compound document reference and the identity of the client's principal to the compound document server, the compound document server is able to determine which compound document to print and can verify that the client object 117 has permission to print the compound document by checking that the authenticated identity belongs to the group specified when the compound document was created and by comparing the unforgeable number in the object reference with the unforgeable number in the object.

In order to print the compound document, the compound document server needs to have the data associated with the spreadsheet object. So, the compound document server sends a Get Data request to the spreadsheet server (Step 223). The Get Data request includes the spreadsheet object reference so that the spreadsheet server knows which spreadsheet object from which to retrieve the data. The Get Data request also includes the identity of the principal on whose behalf the compound document server operates.

The compound document server will authenticate itself to the spreadsheet server (Step 225). Any well known technique for authenticating principals can be used to implement this aspect of applicant's embodiment. If the compound document server is successfully authenticated then the spreadsheet server attempts to determine whether the compound document server has access rights which permit it to retrieve data from the spreadsheet object. To determine access rights the spreadsheet server retrieves the group identifier from the spreadsheet object. The spreadsheet server then sends the group identifier and the authenticated principal identifier to the membership mechanism 123, along with a request to determine whether the authenticated principal is a member of the group with access rights to the spreadsheet object (Step 227). Any well known mechanism for checking group membership may be used to implement this aspect of applicant's embodiment.

If the compound document server's authenticated principal is a member of the specified group then the spreadsheet server makes yet another check to ensure that the compound document is authorized to access the spreadsheet object. The spreadsheet server retrieves the unforgeable number from the spreadsheet server reference and compares it to the unforgeable number stored with the spreadsheet server object (in a preferred embodiment this step would preferably be implemented first) (Step 229). If the unforgeable numbers match then the spreadsheet server permits the compound document server to retrieve the necessary data from the spreadsheet object, subject to the access rights stored with the object (Step 231).

Once the spreadsheet data is retrieved, the compound document server sends the compound document data to a print server for printing (Step 233).

One of the benefits associated with the first embodiment is that no cryptographic operations are needed to determine whether a client who is requesting access to an object is authorized to access the object. Instead, the first embodiment accomplishes this authorization check by maintaining a group identifier in the state data of the spreadsheet object and then using the group identifier to determine whether the requesting client operates on behalf of a user who is a member of the appropriate group. This group membership check is typically less expensive to perform than a cryptographic operation.

Another advantage of the first embodiment is that the spreadsheet server can determine who has access to a given object just using state data maintained at the spreadsheet object. In other prior art implementations this was not possible because only object references stored access rights information. Access rights information was not stored with the object itself.

Second Embodiment

Figure 3B:
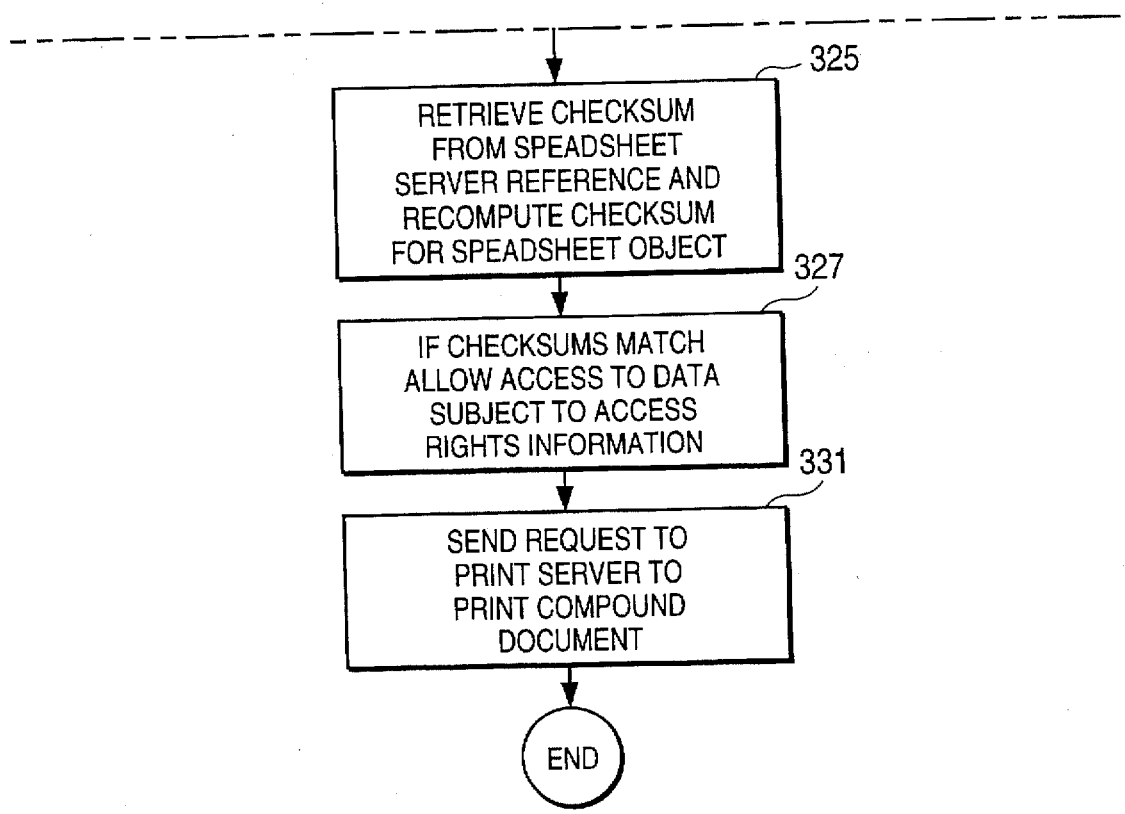
FIG. 3 is a flow diagram illustrating the preferred steps of a second embodiment for securely controlling access to system resources.
Figure 3:
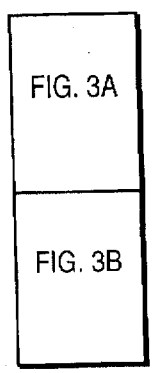
Figure 3A:
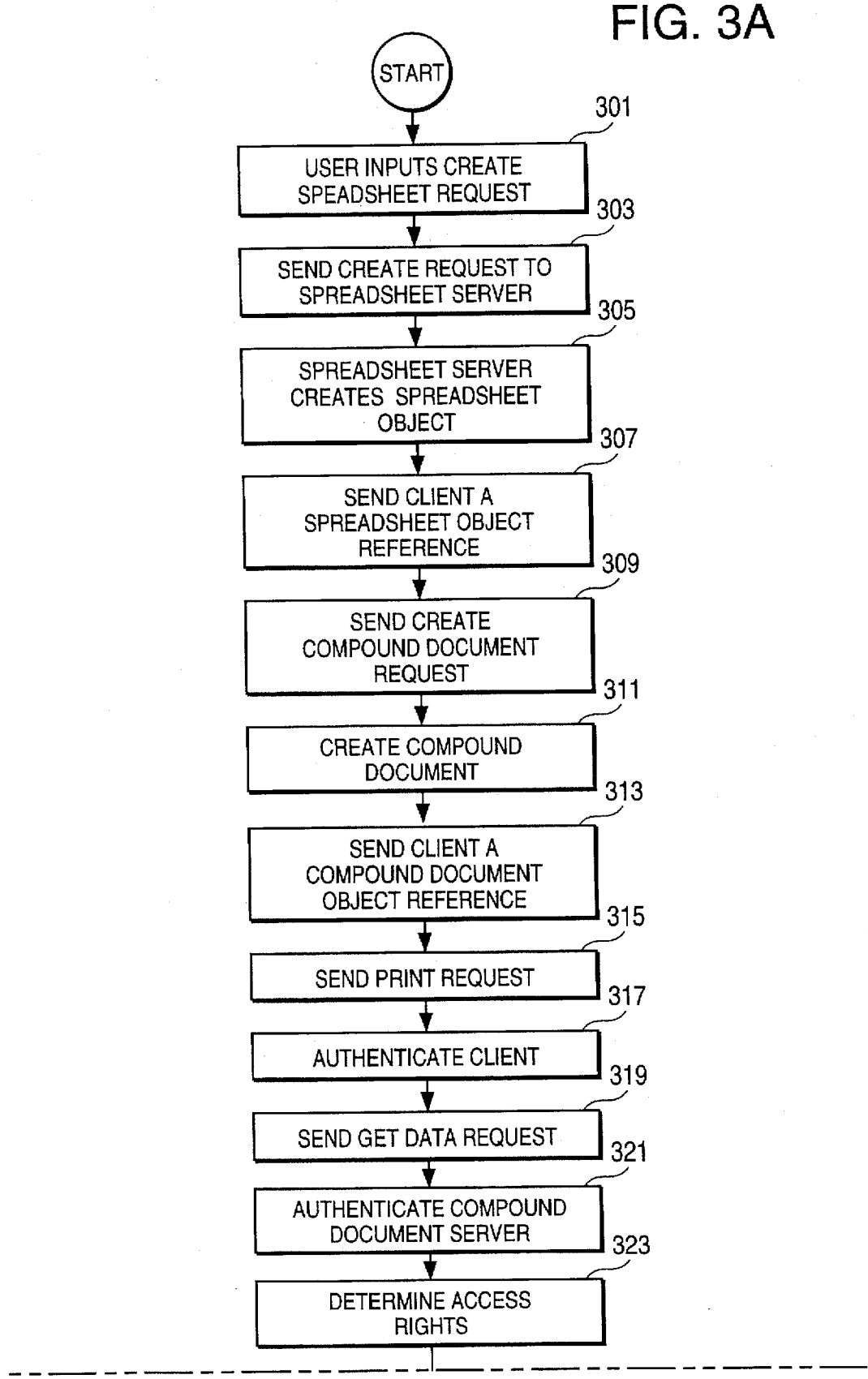

FIG. 3 is a flow diagram illustrating the preferred steps of a second embodiment for securely controlling access to system resources. The steps of FIG. 3 are typically initiated in response to user input. Suppose that the principal initiates a request on the client 117 to create a spreadsheet (Step 301). In response to the input, the client object 117 sends a Create request to the spreadsheet server object (Step 303). The request indicates that a spreadsheet object should be instantiated. The request also includes the group identifier associated with the principal on whose behalf the compound document server operates.

The spreadsheet server object receives the request and creates the spreadsheet object (Step 305). The spreadsheet server object then sends to the client object 117, a spreadsheet object reference (Step 307). In the second embodiment, the spreadsheet object reference comprises the group identifier sent with the Create request, an entry indicating the access rights privileges of the group, and a spreadsheet object identifier. The spreadsheet object reference may be run through a cryptographic one-way hash function to produce a cryptographic checksum on the object reference data. The cryptographic checksum is also saved in or associated with the spreadsheet object reference. The spreadsheet object reference then has greater protection against forgery.

Once spreadsheet object server returns processing control to the client object, the client object sends a request to create a compound document to the compound document server 119 (Step 309). The Create request includes an indication that a compound document should be created. The Create request also includes the spreadsheet object reference so that the compound document server knows which spreadsheet object to incorporate into its compound document. Finally, the Create request includes a selected group identifier so that the compound document server can determine whether an object operating on behalf of some principal requesting access to the compound document is authorized to access the compound document.

The compound document server creates the compound document and stores the spreadsheet object reference in the compound document (Step 311). The compound document server object 119 then sends to the client object 117, a compound document object reference (Step 313). In the second embodiment, the compound document object reference comprises the group identifier, an entry which indicates the access rights of those in the group, an identifier for the compound document, and a cryptographic checksum generated by the compound document server during creation of the compound document reference.

At some later point in the client object sends a print request to the compound document server (Step 315). The Print request passes the compound document reference and the identity of the client's principal to the compound document server. The client uses any well known authentication mechanism to prove to the compound server that it has the right to operate on behalf of the client's principal (Step 317). In this way the compound document server understands which compound document to print and can verify that the client object 117 has permission to print the compound document by using a cryptographic checksum as described in more detail below.

In order to print the compound document, the compound document server needs to have the data associated with the spreadsheet object. So, the compound document server sends a Get Data request to the spreadsheet server (Step 319). The Get Data request includes the spreadsheet object reference so that the spreadsheet server knows the spreadsheet object from which to retrieve the data. The Get Data request also includes the identity of the principal on whose behalf the compound document server operates.

The spreadsheet server authenticates the compound document server (Step 321). Any well known technique for authenticating principals can be used to implement this aspect of applicant's second embodiment. If the compound document server is successfully authenticated then the spreadsheet server attempts to determine whether the compound document server has access rights which permit it to retrieve data from the spreadsheet object (Step 323). To determine access rights the spreadsheet server retrieves the group identifier associated with the spreadsheet object reference. The spreadsheet server then retrieves the spreadsheet identifier from the spreadsheet object reference. Finally, the spreadsheet server sends the retrieved information to the membership mechanism 123, along with a request to determine whether the authenticated principal is a member of the identified group with access rights to the spreadsheet object. Any well known mechanism for checking group membership may be used to implement this aspect of applicant's second embodiment.

If the authenticated principal is a member of the identified group then the spreadsheet server makes yet another check to ensure that the compound document is authorized to access the spreadsheet object. The spreadsheet server retrieves the cryptographic checksum from the spreadsheet object reference and then recomputes the cryptographic checksum for the spreadsheet object (Step 325). Next, the spreadsheet server compares the retrieved checksum with the recomputed checksum (Step 327). If the checksums match then the spreadsheet server permits the compound document server to retrieve the necessary data from the spreadsheet object, subject to the access rights in the object reference.

Once the spreadsheet data is retrieved, the compound document server sends the compound document data to a print server for printing (Step 329).

One of the benefits of the second embodiment is that the client object, by maintaining state about which group is authorized to use an object reference and what other members are in the group, can pass that object reference associated with that group to another principal in the group without having to engage in any message exchanges with the server. Avoiding such interactions with the spreadsheet server improves performance and efficiency.

Modifications

While specific embodiments have been described herein for purposes of illustration, various modifications may be made without departing from the spirit and scope of the invention. Accordingly, the invention is not limited to the above described embodiments.

For example, there are a number of ways the two embodiments might be modified according to techniques widely understood by someone familiar with the current art. In the first embodiment, the group identifier might not only be stored in the object, but also sent with the object reference as a hint to the client. This hint could be used to bypass a message exchange with the server when the object reference is passed to a second client. The first client could check that the second client is in the group. Without this hint, the first client must request the group identifier from the server, which involves a message exchange.

In the second embodiment, the server could cache object references with the object when they are presented for use. On a subsequent presentation, the server could check the object reference sent by the client with those in the cache. This means that if the object reference was presented by a different client in the same group, the server need not recompute the cryptographic checksum, which would reduce the computation by the server for that access and hence increase its performance.

What is claimed is:

1. A method executed in a computer system for facilitating access control to system resource in a distributed computer system, the distributed computer system including a first server object, a target object, a client object and a second server object, each of the objects belonging to one or more specified groups of objects residing in the computer system, the method comprising the steps of:

under control of the first server object,
storing a group identifier associated with the target object in the first server object, the group identifier identifying the group of object in the computer system with access privileges to the target object;

under control of the second server object,
sending an access request to the first server object requesting access to the target object, the access request including a second server principal identifier which identifies a principal operating the second server object;

under control of the first server object,
verifying that the second server object has permission to access the target object by using the group identifier associated with the target object and the second server principal identifier included in the access request from the second server object; and
sending a target object reference to the client object when the second server object has the permission to access the target object, the target object reference indicating a location of the target object in the computer system;

under control of the client object,
locating a second server object which operates on behalf of a member of the group to which the client object belongs; and
sending and obtain request to the located second server object requesting that the second server object obtain a container object which references the target object, the obtain request including the target object reference and a group identifier which identifies the group to which the client object belongs; and under control of the second server object,
obtaining the container object from the second server object; and
storing the target object reference and the group identifier in the container object.

2. The method of claim 1 further comprising the steps of:

under control of the client object,
sending a use request to the second server object to use the container object, the use request including a container object reference indicating a location of the container object in the computer system and a client object principal identifier which identifies a principal operating the client object; and under control of the second server object,
in response to the use request from the client object, sending a further access request to the first server object to access the target object, the further access request including the target object reference and the second server principal identifier.

3. The method of claim 2 further comprising the steps of:

under control of the first server object,
authenticating the second server object as a member of the group with access rights to the target object using the second server principal identifier; and
determining whether the second server is authorized to access the target object.

4. The method of claim 3 wherein the step of determining whether the second server is authorized further comprises the steps of:

retrieving an unforgeable number stored with the target object reference in the further access request;
comparing the retrieved unforgeable number with an unforgeable number stored with the target object in the first server object; and
when the unforgeable numbers match, permitting the second server object to access the target object.

5. The method of claim 1 further comprising the steps of:

under control of the first server object,
retrieving the group identifier from the target object;
sending the retrieved group identifier and the second server principal identifier to a membership mechanism;
sending a membership request to determine whether the principal is a member of the group with access rights to the target object; and
when the second server object is determined to be operating on behalf of a principal who is a member of the group with access rights to the target object in response to the membership request, permitting the second server object to access the target object.

6. The method of claim 1 further comprising the steps of:

under control of the client object,
sending a creation request to the first server object indicating that the first server object should create the target object; and under control of the first server object,
creating the target object; and
storing an indication of the access rights that group members have with respect to the target object.

7. A computer system for facilitating access control to system resources in a distributed computer system, the distributed computer system including a first server object, a target object, a client object and a second server object, each of the objects belonging to one or more specified groups of objects residing in the computer system, the system comprising:

the first server object configured to,
store a group identifier associated with the target object in the first server object, the group identifier identifying the group of objects in the system with access privileges to the target object;

the second server object configured to,
send an access request to the first server object requesting access to the target object, the access request including a second server principal identifier which identifies a principal operating the second server object;

the first server object configured to,
verify that the second server object has permission to access the target object by using the group identifier associated with the target object and the second server principal identifier included in the access request from the second server object; and
send a target object reference to the client object when the second server object has the permission to access the target object, the target object reference indicating a location of the target object in the computer system;

the client object configured to,
locate a second server object which operates on behalf of a member of the group to which the client object belongs; and
send an obtain request to the located second server object requesting that the second server object obtain a container object which references the target object, the obtain request including the target object reference and a group identifier which identifies the group to which the client object belongs; and the second server object configured to,
obtain the container object from the second server object; and
store the target object reference and the group identifier in the container object.

8. The system of claim 7 further comprising:
the client object configured to,
send a use request to the second server object to use the container object, the use request including a container object reference indicating a location of the container object and a client object principal identifier which identifies a principal operating the client object; and the second server object configured to,
in response to the use request from the client object, send a further access request to the first server object to access the target object, the further access request including the target object reference and the second server principal identifier.

9. The system of claim 8 further comprising:
the first server object configured to,
authenticate the second server object as a member of the group with access rights to the target object using the second server principal identifier; and
determine whether the second server is authorized to access the target object.

10. The system of claim 9 wherein determining whether the second server object is authorized further comprises a system wherein:

retrieve an unforgeable number stored with the target object reference in the further access request;
compare the retrieved unforgeable number with an unforgeable number stored with the target object in the first server object; and
when the unforgeable numbers match, permit the second server object to access the target object.

11. The system of claim 7 further comprising a system wherein:
the first server object is configured to,
retrieve the group identifier from the target object;
send the retrieved group identifier and the second server principal identifier to a membership mechanism;
sending a membership request to determine whether the principal is a member of the group with access rights to the target object; and
when the second server object is determined to operate on behalf of a principal who is a member of the group with access rights to the target object in response to the membership request, permitting the second server object to access the target object.

12. The system of claim 7 further comprising:
the client object configured to,
send a creation request to the first server object indicating that the first server object should create the target object; and
wherein the first server object is configured to,
create the target object; and
store an indication of the access rights that group members have with respect to the target object.

13. A computer program for facilitating access control to system resources in a distributed computer system, the distributed computer system including a first server object, a target object, a client object and a second server object, each of the objects belonging to one or more specified groups of objects residing in the computer system, the program comprising;

code for the first server object configured to,
store a group identifier associated with the target object in the first server object, the group identifier identifying the group of objects in the system with access privileges to the target object;

code for the second server object configured to,
send an access request to the first server object requesting access to the target object, the access request including a second server principal identifier which identifies a principal operating and second server object;

code for the first server object configured to,
verify that the second server object has permission to access the target object by using the group identifier associated with the target object and the second server principal identifier included in the access request from the second server object; and
send a target object reference to the client object when the second server object has the permission to access the target object, the target object reference indicating a location of the target object in the computer system;

code for the client object configured to,
locate a second server object which operates on behalf of a member of the group to which the client object belongs; and
send an obtain request to the located second server object requesting that the second server object obtain a container object which references the target object, the obtain request including the target object reference and a group identifier which identifies the group to which the client object belongs; and code for the second server object configured to,
obtain the container object from the second server object; and
store the target object reference and group identifier in the container object;

wherein the codes are stored on a tangible medium.

14. The program of claim 13 further comprising:

code for the client object configured to,
send a use request to the second server object to use the container object, the use request including a container object reference indicating a location of the container object in the computer system and a client object principal identifier which identifies a principal operating the client object; and code for the second server object configured to,
in response to the use request from the client object, send a further access request to the first server object to access the target object, the further access request including the target object reference and the second server principal identifier.

15. The program of claim 14 further comprising:

code for the first server object configured to,
authenticate the second server object as a member of the group with access rights to the target object using the second server principal identifier; and
determine whether the second server is authorized to access the target object.

16. The program of claim 15 wherein determining whether the second server is authorized further comprises code configured to:

retrieve an unforgeable number stored with the target object reference in the further access request;
compare the retrieved unforgeable number with an unforgeable number stored with the target object in the first server object; and
when the unforgeable numbers match, permitting the second server object to access the target object.

17. The program of claim 13 further comprising:

code for the first server object configured to,
retrieve the group identifier from the target object;
send the retrieved group identifier and the second server principal identifier to a membership mechanism;
send a membership request to determine whether the principal is a member of the group with access rights to the target object; and
when the second server object is determined to operate on behalf of a principal who is a member of the group with access rights to the target object in response to the membership request, permitting the second server object to access the target object.

18. The program of claim 13 further comprising:

code for the client object configured to,
send a creation request to the first server object indicating that the first server object should create the target object; and
wherein the code for first server object is configured to, create the target object; and
store an indication of the access rights that group members have with respect to the target object.

* * * * *